United States Patent
Thompson

(10) Patent No.: US 12,014,642 B2
(45) Date of Patent: Jun. 18, 2024

(54) NAVIGATION BASED ON EARTH CENTERED EARTH FIXED (ECEF) FRAME OF REFERENCE

(71) Applicant: Raytheon Company, Waltham, MA (US)

(72) Inventor: Arland B. Thompson, Littleton, CO (US)

(73) Assignee: Raytheon Company, Tewksbury, MA (US)

( * ) Notice: Subject to any disclaimer, the term of this patent is extended or adjusted under 35 U.S.C. 154(b) by 175 days.

(21) Appl. No.: 17/223,874

(22) Filed: Apr. 6, 2021

(65) Prior Publication Data

US 2022/0013021 A1 Jan. 13, 2022

Related U.S. Application Data

(60) Provisional application No. 63/025,046, filed on May 14, 2020.

(51) Int. Cl.
*G08G 5/00* (2006.01)
*G01C 21/16* (2006.01)

(52) U.S. Cl.
CPC .......... *G08G 5/0073* (2013.01); *G01C 21/16* (2013.01)

(58) Field of Classification Search
CPC ....... G08G 5/0073; G01C 21/16; G05D 1/101
See application file for complete search history.

(56) References Cited

U.S. PATENT DOCUMENTS

| 6,249,745 B1* | 6/2001 | Hsu | G01C 21/16 701/504 |
| 2004/0064252 A1* | 4/2004 | Kirkland | G01C 21/16 701/511 |
| 2004/0149036 A1* | 8/2004 | Foxlin | A61B 5/1113 702/94 |
| 2011/0125404 A1* | 5/2011 | Czompo | G01S 19/49 701/472 |
| 2015/0153460 A1* | 6/2015 | Fleming | G01C 21/165 702/150 |

(Continued)

OTHER PUBLICATIONS

Noureldin ,Basic Navigational Mathematics, Reference Frames and the Earth' Geometry, 2013 (Year: 2013).*

(Continued)

*Primary Examiner* — Kyle R Quigley

(57) ABSTRACT

An apparatus includes an inertial measurement unit (IMU) configured to generate information identifying accelerations and changes in angular orientation associated with an object in motion. The apparatus also includes at least one processor configured to identify a navigation state of the object within an Earth-fixed frame of reference using the information and perform one or more navigation functions based on the navigation state. To identify the navigation state of the object, the at least one processor is configured to use (i) an object body or IMU-to-inertial transformation that is updated based on the changes in angular orientation and (ii) an inertial-to-Earth-fixed transformation. The navigation state of the object may be identified in each of multiple iterations, and the at least one processor may be configured to update the inertial-to-Earth-fixed transformation during the iterations.

20 Claims, 3 Drawing Sheets

(56) References Cited

U.S. PATENT DOCUMENTS

2016/0327394 A1* 11/2016 Al-Rawashdeh ...... G01C 21/16
2017/0059602 A1*  3/2017 Miller ................ G01C 21/1654
2017/0219351 A1*  8/2017 Hamilton ................ G01S 19/19

OTHER PUBLICATIONS

Brian (Quaternion Interpolation , 1999) (Year: 1999).*
Nicholas, Attitude and Formation Control Design, MIT, 2013 (Year: 2013).*
Yoon et al., Introduction into quaternions for spacecraft attitude representation, University of Berlin, 2012 (Year: 2012).*
Whittaker, Inertial navigation employing a common frame of reference, University of Buffalo, 2019 (Year: 2019).*
"An Overview of Reference Frames and Coordinate Systems in the SPICE Context," NAIF, Jan. 2020, 30 pages.
El-Osery et al., "EE 570: Location and Navigation, Navigation Mathematics: Kinematics (Coordinate Frame Transformation)," Feb. 2016, 22 pages.
El-Osery et al., "EE 570: Location and Navigation, Navigation Mathematics: Coordinate Frames," Jan. 2016, 36 pages.

* cited by examiner

NAVIGATION BASED ON EARTH CENTERED EARTH FIXED (ECEF) FRAME OF REFERENCE

CROSS-REFERENCE TO RELATED APPLICATION AND PRIORITY CLAIM

This application claims priority under 35 U.S.C. § 119(e) to U.S. Provisional Patent Application No. 63/025,046 filed on May 14, 2020, which is hereby incorporated by reference in its entirety.

TECHNICAL FIELD

This disclosure relates generally to navigation systems. More specifically, this disclosure relates to navigation based on an Earth Centered Earth Fixed (ECEF) frame of reference.

BACKGROUND

Highly-accurate practical navigation schemes are of great importance in various commercial and defense-related applications. Practical navigation schemes are navigation schemes that can be performed using available processing resources (such as processors and memories) while meeting specified operational requirements (such as computational speeds). Many navigation schemes use equations of motion to convert detected movements of a vehicle or other object into an estimated location of the object. To a large extent, the choice of a coordinate system used to integrate the equations of motion can drive the implementation of a particular navigation scheme.

SUMMARY

This disclosure relates to navigation based on an Earth Centered Earth Fixed (ECEF) frame of reference.

In a first embodiment, a method includes obtaining information from an inertial measurement unit (IMU) identifying accelerations and changes in angular orientation associated with an object in motion. The method also includes identifying a navigation state of the object within an Earth-fixed frame of reference using the information. The method further includes performing one or more navigation functions based on the navigation state. Identifying the navigation state of the object includes using (i) an object body or IMU-to-inertial transformation that is updated based on the changes in angular orientation and (ii) an inertial-to-Earth-fixed transformation.

In a second embodiment, an apparatus includes an IMU configured to generate information identifying accelerations and changes in angular orientation associated with an object in motion. The apparatus also includes at least one processor configured to identify a navigation state of the object within an Earth-fixed frame of reference using the information and perform one or more navigation functions based on the navigation state. To identify the navigation state of the object, the at least one processor is configured to use (i) an object body or IMU-to-inertial transformation that is updated based on the changes in angular orientation and (ii) an inertial-to-Earth-fixed transformation.

In a third embodiment, a non-transitory computer readable medium contains instructions that when executed cause at least one processor to obtain information from an IMU identifying accelerations and changes in angular orientation associated with an object in motion. The medium also contains instructions that when executed cause the at least one processor to identify a navigation state of the object within an Earth-fixed frame of reference using the information. The medium further contains instructions that when executed cause the at least one processor to perform one or more navigation functions based on the navigation state. The instructions that when executed cause the at least one processor to identify the navigation state of the object include instructions that when executed cause the at least one processor to identify the navigation state of the object using (i) an object body or IMU-to-inertial transformation that is updated based on the changes in angular orientation and (ii) an inertial-to-Earth-fixed transformation.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
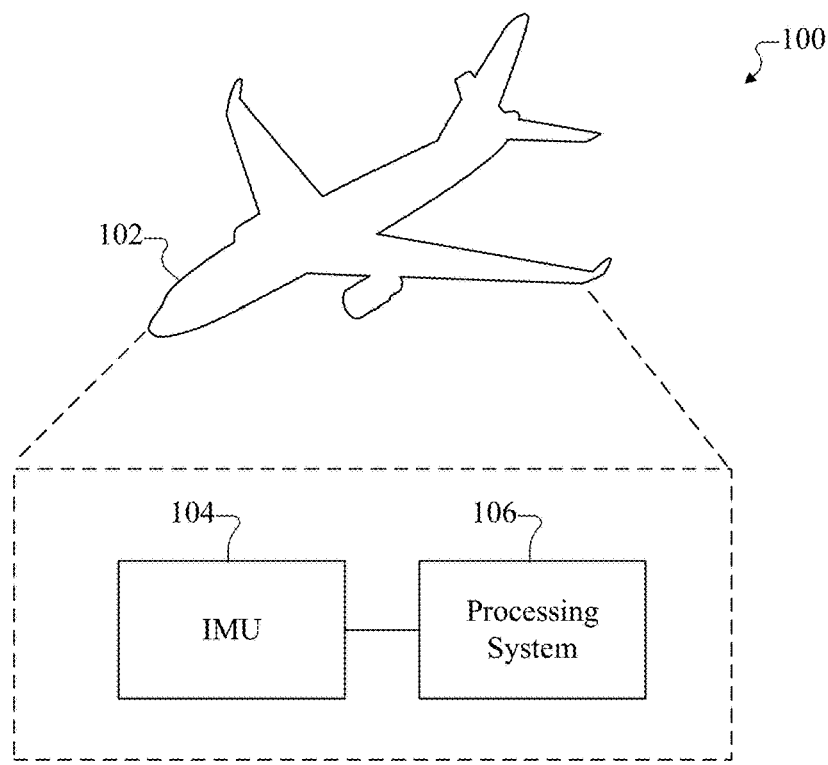
FIG. 1 illustrates an example system supporting navigation based on an Earth Centered Earth Fixed (ECEF) frame of reference according to this disclosure.

FIGS. 1 through 5, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

As noted above, highly-accurate practical navigation schemes are of great importance in various commercial and defense-related applications. Practical navigation schemes are navigation schemes that can be performed using available processing resources (such as processors and memories) while meeting specified operational requirements (such as computational speeds). Many navigation schemes use equations of motion to convert detected movements of a vehicle or other object into an estimated location of the object. To a large extent, the choice of a coordinate system used to integrate the equations of motion can drive the implementation of a particular navigation scheme.

Many applications use an Earth Centered Inertial (ECI) frame of reference to integrate the equations of motion. One example of an ECI frame of reference is defined based on the Earth's mean equator and equinox at 12:00 PM terrestrial time on Jan. 1, 2000 (referred to as "EME J2000"). ECI frames of reference have their origins at the Earth's center of mass and multiple axes that are fixed, meaning the ECI frames of reference do not rotate as the Earth rotates. As a result, this often makes ECI frames of reference useful in describing the motion of celestial bodies and spacecraft.

This disclosure provides systems and methods that support navigation by maintaining state information (such as position and velocity information) of a vehicle or other object in motion relative to a geocenter in an Earth Centered Earth Fixed (ECEF) frame of reference. An ECEF frame of reference includes an origin at the Earth's center of mass and multiple axes that are fixed relative to the Earth, meaning the ECEF frame of reference rotates as the Earth rotates.

Among other things, this disclosure provides various equations that can be used by a navigation system or method to support ECEF-based navigation. This disclosure also provides unique approaches for maintaining a matrix that is used throughout travel to perform body frame-to-ECEF or inertial measurement unit (IMU)-to-ECEF transformations. This matrix is used to transform object-sensed accelerations (such as of thrust and aerodynamics for a vehicle) into ECEF-based information that is used, along with a unique and natural set of state update equations, to integrate the equations of motion and identify updated positions and velocities. In addition, this disclosure provides unique approaches for integrating the equations of motion in order to maintain position and velocity of a vehicle or other object over time. Prior approaches used to maintain a body frame to Earth-fixed frame transformation rely on the transformation itself, which forces assumptions to be made in order to maintain the transformation. The disclosed approaches presented here have no need for such approximations, which eliminates the need for approximation methods for maintaining the body-to-ECEF transformation matrix. State update equations used to identify position and velocity are second-order for accuracy and are unique, natural, and require less storage and processing.

ECEF-based navigation systems and methods may have various benefits or advantages depending on the implementation. Among other things, expressing navigation equations in ECEF-based coordinates can present various advantages depending on the situation. For example, the described approaches can provide speed and efficiency improvements in navigation calculations compared to ECI-based navigation calculations. As a result, this allows navigation systems and methods to operate more quickly and/or more efficiently when performing navigation-based operations. In some cases, this allows the navigation systems and methods to use computing resources (such as processing and memory resources) more efficiently or to use fewer computing resources.

As particular examples, gravity equations can be expressed naturally in the ECEF frame of reference, requiring fewer computations to transform to other coordinate frames and thereby providing enhanced processing speeds. As another example, if a blended inertial navigation system (INS)/global positioning system (GPS) solution (such as a Kalman Filter) or other inertial/position solution is desired, GPS or similar types of measurements may be expressed naturally in ECEF coordinates, which again can be achieved with less processing and better computational speeds. For solutions that use geodetic coordinates, position and velocity can be maintained in ECEF coordinates, so conversion can be straightforward without any intermediate coordinate frame transformations. State update equations are expressed below as second-order equations for improved speed and efficiency to support the use of the described approaches in various types of applications, including in real-time systems.

FIG. 1 illustrates an example system 100 supporting navigation based on an ECEF frame of reference according to this disclosure. As shown in FIG. 1, the system 100 involves or is implemented using a vehicle 102, which generally represents an object that flies through, is launched through or into, or otherwise travels through a given space. The vehicle 102 can travel through an atmosphere, in space, or under water. In this particular example, the vehicle 102 represents an airplane, such as a commercial passenger jet. However, the vehicle 102 may represent any other suitable type of aircraft, spacecraft, or watercraft. As particular examples, the vehicle 102 may represent an aircraft, projectile, rocket, rocket booster, missile, drone or other unmanned aerial vehicle, satellite, ocean freighter, cruise ship, or submarine.

The vehicle 102 here includes an IMU 104 and a processing system 106. In some embodiments, these components 104, 106 may form part of the avionics system of the vehicle 102, although this need not be the case. The IMU 104 generally operates to gather information about forces acting on the vehicle 102. The forces that cause the vehicle 102 to move typically include the Earth's gravity, thrust that the vehicle 102 is exerting (such as via one or more rocket engines, jet engines, or propellers), as well as aerodynamic forces and fluid dynamic forces (in the case of water-based vehicles). The IMU 104 can measure accelerations and other information and pass this information to the processing system 106 for analysis. Note that accelerations caused by gravity are not measured by the IMU 104 and are instead computed by the processing system 106. The IMU 104 also gathers information about how the vehicle 102 is rotating so that the processing system 106 can identify the orientation of the vehicle 102 in a given space. The IMU 104 includes any suitable structure configured to identify acceleration and orientation of the vehicle 102, such as one or more sensors. In some embodiments, the IMU 104 includes one or more accelerometers used to measure changes in velocity of the vehicle 102 and one or more gyroscopes used to measure changes in angular orientation of the vehicle 102.

The processing system 106 executes or otherwise implements logic that processes measurement data from the IMU 104 (and possibly one or more other sources) to perform at least one navigation-related function. For example, the processing system 106 generally supports a process known as "navigation" in which the vehicle's position and velocity are known at some specified time interval. As a particular example, the processing system 106 may determine the vehicle's position and velocity every ten milliseconds or at some other regular interval of time. In many cases, the vehicle 102 needs to know its position and velocity relative to some frame of reference and at some time interval in order to carry out one or more other functions of the vehicle 102. As a result, navigation is a critical function, and a failure of navigation can cause a failure of the vehicle 102 itself.

Among other things, the processing system 106 supports the approaches described below to enable the use of an ECEF frame of reference during one or more navigation-related operations. The processing system 106 also supports the approaches described below to provide increased accuracy for one of the matrices used in one or more navigation-related operations to pass accelerations from the IMU 104 or other source(s) to software or other logic of the processing system 106 for processing. In addition, the processing system 106 supports the approaches described below to provide improved techniques to compute position and velocity during one or more navigation-related operations. The associated equations used by the processing system 106 during navigation are formulated in such a way that less processing is needed while retaining higher-order accuracy.

This can help to reduce the computing resources used by the processing system 106 or allow fewer computing resources to be used by the processing system 106 to engage in one or more navigation-related operations.

The processing system 106 includes any suitable structure configured to perform one or more navigation-related functions. In general, the navigation-related functionality of the processing system 106 may be implemented in any suitable manner, such as when implemented using dedicated hardware or a combination of hardware and software/firmware instructions. In some embodiments, the navigation-related functionality of the processing system 106 can be implemented in software/firmware instructions that are embedded in or used with an avionics systems or other on-board processor or computer of a space or airborne vehicle (such as a satellite, rocket, rocket booster, drone or other unmanned aerial vehicle, tactical missile, or commercial or military aircraft) or a water vessel (such as an ocean freighter, cruise ship, or submarine).

Calculated positions and velocities of the vehicle 102 (or any other suitable navigation-related information) as determined by the processing system 106 may be used in any suitable manner by the vehicle 102 or a device or system external to the vehicle 102. For example, the calculated positions and velocities may be provided to a vehicle control system for use in making adjustments to the travel path of the vehicle 102. This may allow the vehicle 102 to automatically remain on a desired flight path or other travel path or to automatically make adjustments to its actual flight path or other travel path. As another example, the calculated positions and velocities may be provided to a display system for presentation of the vehicle's location or travel path on a map, such as when presented on a pilot's display screen or other personnel's display screen(s). The calculated positions and velocities of the vehicle 102 may be used in any other suitable manner.

Although FIG. 1 illustrates one example of a system 100 supporting navigation based on an ECEF frame of reference, various changes may be made to FIG. 1. For example, the system 100 may involve the use of any other suitable vehicle or other object for which navigation is needed or desired. Also, the vehicle 102 may include any additional components as needed or desired in order to support additional functions of the vehicle 102.

Figure 2:
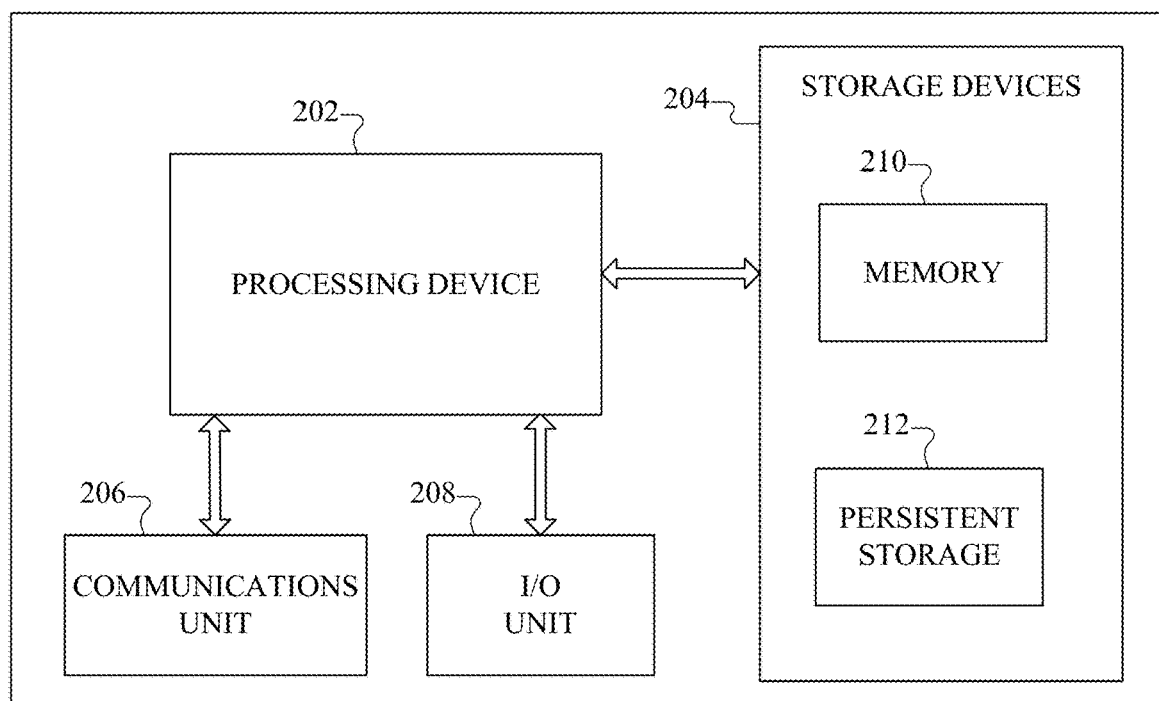
FIG. 2 illustrates an example computing device or system supporting navigation based on an ECEF frame of reference according to this disclosure.

FIG. 2 illustrates an example computing device or system 200 supporting navigation based on an ECEF frame of reference according to this disclosure. The device or system 200 may, for example, represent or be used to at least partially implement the processing system 106 in the vehicle 102 of FIG. 1. Note, however, that the device or system 200 may be used in any other suitable vehicle or other object and in any other suitable system. Also note that the processing system 106 may be implemented in any other suitable manner.

As shown in FIG. 2, the computing device or system 200 may include at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry. Among other things, the processing device 202 may be used to process information from the IMU 104 in order to perform one or more navigation-related functions, such as identifying positions and velocities of the vehicle 102 as described below.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc. Among other things, the memory 210 and/or the persistent storage 212 may store instructions executed by the processing device 202. The memory 210 and/or the persistent storage 212 may also or alternatively store data used, generated, or collected by the processing system 106, such as data from the IMU 104 or one or more calculated positions and velocities.

The communications unit 206 supports communications with other systems or devices. The communications unit 206 may support communications through any suitable physical or wireless communication link(s), such as a network or dedicated connection(s). As a particular example, the communications unit 206 may support communications with the IMU 104 and any device or system that uses positions and velocities or other navigation-related information associated with the vehicle 102. The communications unit 206 includes any suitable structure configured to enable communications with one or more external components, such as a network interface card or a wireless transceiver.

The I/O unit 208 allows for input and output of data. For example, the I/O unit 208 may provide a connection for user input through a keyboard, mouse, keypad, touchscreen, or other suitable input device. The I/O unit 208 may also send output to a display or other suitable output device. Note, however, that the I/O unit 208 may be omitted if the device or system 200 does not require local I/O, such as when the device or system 200 represents a component that can be accessed remotely over a network.

In some embodiments, the device or system 200 uses navigation equations and provides a real-time system for navigation. A real-time system is a time-bound system that has fixed and well-defined time constraints. In this type of system, processing is performed within these defined constraints in order to ensure proper operation of the overall real-time system. Note, however, that any other suitable devices or systems may be used to implement the disclosed approaches described in this patent document (including non-real-time devices or systems).

Although FIG. 2 illustrates one example of a computing device or system 200 supporting navigation based on an ECEF frame of reference, various changes may be made to FIG. 2. For example, in general, computing devices and systems come in a wide variety of configurations, and FIG. 2 does not limit this disclosure to any particular device or system. Also, various components in FIG. 2 may be combined, further subdivided, replicated, omitted, or rearranged and additional components may be added according to particular needs.

Figure 3:
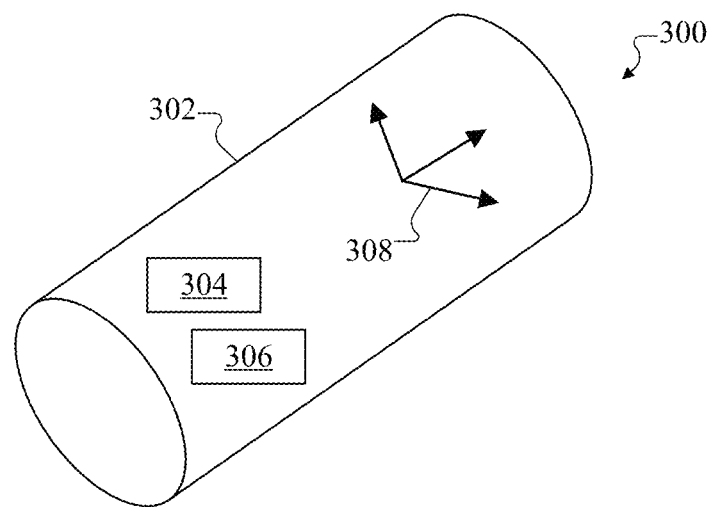
FIG. 3 illustrates an example inertial measurement unit for navigation based on an ECEF frame of reference according to this disclosure.

FIG. 3 illustrates an example IMU 300 for navigation based on an ECEF frame of reference according to this disclosure. The IMU 300 may, for example, represent or be used to at least partially implement the IMU 104 in the vehicle 102 of FIG. 1. Note, however, that the IMU 300 may be used in any other suitable vehicle or other object and in any other suitable system. Also note that the IMU 104 may be implemented in any other suitable manner.

As shown in FIG. 3, the IMU 300 generally includes a housing 302, which is used to encase, protect, or otherwise contain other components of the IMU 300 or other components of a larger system. The housing 302 may be formed from any suitable material(s), such as one or more metals or ruggedized plastic. The housing 302 may also be formed in any suitable manner. In addition, the housing 302 may have any suitable size, shape, and dimensions. In this example, the housing 302 has the form of an elongated cylinder, although this is simply for illustration only.

The IMU 300 also includes multiple sensors 304 and 306 used to collect information about movements of a vehicle 102 or other object. The sensors 304 and 306 may be used to collect any desired information about the movements of a vehicle 102 or other object. For example, the sensor(s) 304 may represent one or more accelerometers configured to measure accelerations (changes in velocity) of the vehicle 102 or other object. As a particular example, the sensors 304 may include three accelerometers configured to measure accelerations relative to three axes. The sensor(s) 306 may include one or more gyroscopes configured to measure changes in angular orientation of the vehicle 102. As a particular example, the sensors 306 may include three gyroscopes configured to measure changes in angular orientation relative to three axes. Each of the sensors 304, 306 includes any suitable structure configured to measure one or more characteristics of movement of an object. Note that while shown as being separate components here, one or more accelerometers and one or more gyroscopes may be implemented in a common package.

The IMU 300 typically expresses its measurements within a coordinate system 308 that is distinct from the ECEF coordinate system or other external coordinate system. For example, the IMU 300 may define the x-axis of the coordinate system 308 as extending along the length (front-to-back) of the vehicle 102, the y-axis of the coordinate system 308 as extending across the width (side-to-side) of the vehicle 102, and the z-axis of the coordinate system 308 as extending across the height (top-to-bottom) of the vehicle 102. This may generally align the coordinate system 308 with the vehicle body's coordinate frame, which is convenient in various ways (although this is not necessarily required). Typically, the various axes of the coordinate system 308 are orthogonal to one another (although again this is not necessarily required). The processing system 106 or other suitable system of the vehicle 102 or other object may therefore transform measurements from the IMU 300 from a vehicle body coordinate system or IMU coordinate system 308 into ECEF-based information that can be used to identify the position and velocity of the vehicle 102 or other object in an ECEF frame of reference.

Although FIG. 3 illustrates one example of an IMU 300 for navigation based on an ECEF frame of reference, various changes may be made to FIG. 3. For example, in general, IMUs come in a wide variety of configurations, and FIG. 3 does not limit this disclosure to any particular IMU.

Figure 4:
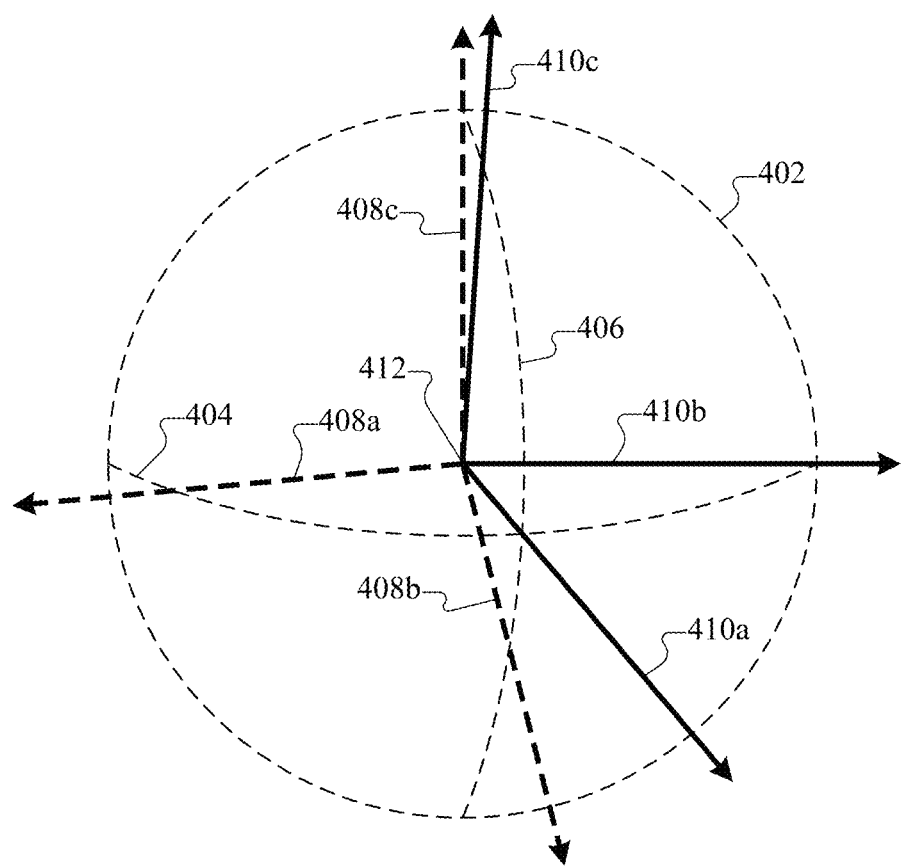
FIG. 4 illustrates example frames of reference including an ECEF frame of reference for navigation according to this disclosure.

FIG. 4 illustrates example frames of reference including an ECEF frame of reference for navigation according to this disclosure. In particular, FIG. 4 illustrates an example ECI frame of reference (namely the EME J2000 frame of reference) and an example ECEF frame of reference (namely the International Terrestrial Reference System or "ITRS" frame of reference). As shown in FIG. 4, the frames of reference are defined relative to the Earth 402, where one imaginary line defines the equator 404 and another imaginary line defines the prime meridian 406.

The ECI frame of reference is defined by a +X axis 408a, a +Y axis 408b, and a +Z axis 408c. Note that all three axes also extend in the opposite directions (meaning −X, −Y, and −Z). In the EME J2000 frame of reference, the +X axis 408a is defined by the intersection of the mean equator 404 and the mean ecliptic (the plane of the Earth's orbit around the sun) as of the J2000 epoch. Also, the +Y axis 408b is defined as being 90° from the +X axis 408a in the plane of the mean equator 404. In addition, the +Z axis 408c is defined as being perpendicular to the mean equator 404 as of the J2000 epoch. All of these axes 408a-408c pass through an origin at a geocenter 412 of the Earth 402, which represents a center of mass of the Earth 402 (including the oceans and atmosphere). The ECI frame of reference is therefore fixed and does not rotate as the Earth 402 rotates.

In contrast, the ECEF frame of reference is defined by a +X axis 410a, a +Y axis 410b, and a +Z axis 410c. Again, all of these axes 410a-410c pass through the geocenter 412 of the Earth 402, and all three axes also extend in the opposite directions. In the ITRS frame of reference, the +X axis 410a is defined by the intersection of the mean equator 404 and the mean prime meridian 406. Also, the +Y axis 410b is defined as being 90° from the +X axis 410a in the plane of the mean equator 404. In addition, the +Z axis 410c is defined as being based on true north (geodetic north), meaning the +Z axis 410c extends from the geocenter 412 through the true north pole of the Earth 402 as defined by the mean spin axis of the Earth 402. Unlike the ECI frame of reference, the ECEF frame of reference is not fixed and rotates as the Earth 402 rotates.

The following discussion provides an example basis for navigation operations that can be performed by the processing system 106 for a vehicle 102 or other object using measurements from the IMU 104. More specifically, the following discussion provides an example basis for computations that can be performed by the processing system 106 for navigation using an ECEF frame of reference. As described above, the use of the ECEF frame of reference can provide various benefits or advantages, such as more efficient use of computing resources or use of less computing resources by the processing system 106.

The following nomenclature is used in the discussions below. Note that while often described as involving navigation for a vehicle 102, the discussion below can easily apply to any other moving object.

P—Earth precession matrix

N—Earth nutation matrix

θ—Earth rotation matrix

π—Earth polar motion matrix $\vec{r}^i$—Position vector in inertial (ECI) coordinates $\vec{\dot{r}}^i$—Velocity vector in inertial coordinates (first time derivative of position)

$\vec{\ddot{r}}^i$—Total acceleration in inertial coordinates (second time derivative of position)

$\vec{g}^i$—Acceleration due to gravity in inertial coordinates $\vec{a}^i$—Acceleration due to thrust and aerodynamic forces in inertial coordinates $\vec{g}^e$—Acceleration due to gravity in Earth-fixed (ECEF) coordinates $\vec{a}^e$—Acceleration due to thrust and aerodynamic forces in Earth-fixed coordinates $C_e^b$—Direction cosine matrix (DCM) transformation from ECEF to the vehicle body frame of reference or the IMU frame of reference $C_e^i$—DCM transformation from ECEF to the inertial frame of reference $\dot{C}_e^i$—First time derivative of the DCM transformation from ECEF to the inertial frame of reference $\ddot{C}_e^i$—Second time derivative of the DCM transformation from ECEF to the inertial frame of reference $\vec{\omega}_{ib}^{b}(t)$—Angular rate vector of the body/IMU frame of reference relative to the inertial frame of reference as measured and integrated by the IMU 104

$\vec{\omega}_{ie}^{e}$—Three-dimensional angular rate vector of ECEF rotation relative to ECI expressed in ECEF coordinates $\vec{\omega}_{ib}^{b}$—Three-dimensional angular rate vector of body/IMU frame of reference rotation relative to ECI expressed in body or IMU coordinates $\vec{\omega}_{eb}^{b}$—Three-dimensional angular rate vector of body/IMU frame of reference rotation relative to ECEF expressed in body or IMU coordinates $\Omega_{ie}^{e}$—3×3 skew symmetric matrix composed of an ECEF rotation vector relative to ECI expressed in ECEF coordinates $\dot{\Omega}_{ie}^{e}$—First time derivative of the 3×3 skew symmetric matrix $\omega$—Earth's rotation rate (approximately $7.292 \times 10^{-5}$ radians/second)

$\vec{g}$—Acceleration due to gravity in unspecified coordinates $\vec{a}$—Acceleration due to thrust and aerodynamics in unspecified coordinates $\Delta t$—IMU measurement update interval (can be on the order of fractions of milliseconds in some cases)

$\vec{a^b}(t)$—Sensed IMU accelerations in the body/IMU frame of reference $\vec{\Delta V^b}(t \times \Delta t)$—Delta V vector in the body/IMU frame of reference at the end of the IMU update interval as integrated by the IMU 104

$\vec{\Delta \theta_{ib}^{b}}(t \times \Delta t)$—Change in angles of the body/IMU frame of reference relative to the inertial frame of reference over the IMU measurement interval $\vec{\Delta \theta_{eb}^{b}}(t \times \Delta t)$—Change in angles of the body/IMU frame of reference relative to the ECEF frame of reference over the IMU measurement interval $\vec{\theta_{ie}^{e}}(t \times \Delta t)$—Change in angles of the ECEF frame of reference relative to the inertial frame of reference over the IMU measurement interval $q_e^b(t)$—Quaternion representing the transformation from ECEF coordinates to body/IMU coordinates at the current IMU time step $q_e^b(t+\Delta t)$—Quaternion representing the transformation from ECEF coordinates to body/IMU coordinates at the next IMU time step $q_i^b(t)$—Quaternion representing the transformation from inertial coordinates to body/IMU coordinates at the current IMU time step $q_i^b(t+\Delta t)$—Quaternion representing the transformation from inertial coordinates to body/IMU coordinates at the next IMU time step $q_i^e(t)$—Quaternion representing the transformation from inertial coordinates to ECEF coordinates at the current IMU time step $q_i^e(t+\Delta t)$—Quaternion representing the transformation from inertial coordinates to ECEF coordinates at the next IMU time step $C_i^e(t+\Delta t)$—DCM transformation from inertial coordinates to ECEF coordinates at the next IMU time step $C_i^b(t+\Delta t)$—DCM transformation from inertial coordinates to body/IMU coordinates at the next IMU time step $C_b^e(t+\Delta t)$—DCM transformation from body/IMU coordinates to ECEF coordinates at the next IMU time step I—4×4 identity matrix $\Omega_\Theta$—4×4 skew symmetric matrix $\psi$—Vehicle heading (angle of velocity vector from true north)

$\lambda$—Longitude of the vehicle 102 (in radians)

$\varphi$—Geodetic latitude of the vehicle 102 (in radians)

h—Altitude of the vehicle 102 above the Earth's reference ellipse

RE—Earth equatorial radius

RP—Earth polar radius e—Eccentricity of the Earth's ellipse $C_{ECEF}^{NED}$—DCM transformation from ECEF coordinates to NED (North, East, Down) coordinates $\vec{V}_{NED}$—Velocity parameterized in NED coordinates.

In the discussion below, a subscript or superscript "e" designates the ECEF reference frame, a subscript or superscript "i" designates the ECI reference frame, and a subscript or superscript "b" designates the body/IMU reference frame.

A transformation between the ECI frame of reference and the ECEF frame of reference is highly complex and depends on four factors, namely precession (a change in the orientation of the Earth's rotational axis), nutation (rocking or swaying of the Earth's rotational axis), the amount of the Earth's rotation, and polar motion (motion of the Earth's rotational axis relative to its crust). This transformation can be expressed as follows:

$$U(t) = \pi \theta N P \quad (1)$$

The total accelerations acting on the vehicle 102 in the inertial frame of reference (meaning the ECI frame of reference), including gravity, thrust, and aerodynamics, can be expressed as follows:

$$\vec{r}^i = \vec{g}^i + \vec{a}^i \quad (2)$$

The first time derivative of the DCM transformation from the ECEF frame of reference to the inertial frame of reference (defined as $C_e^i$ above) can be expressed as follows:

$$\dot{C}_e^i = C_e^i \Omega_{ie}^e \quad (3)$$

The angular rate vector of the ECEF frame of reference relative to the ECI frame of reference used to populate the elements of $\Omega_{ie}^e$ in Equation (3) can be expressed as:

$$\vec{\omega}_{ie}^e = \begin{bmatrix} 0 \\ 0 \\ \omega \end{bmatrix} \quad (4)$$

Using the multiplication rule, the second time derivative of the DCM transformation from the ECEF frame of reference to the inertial frame of reference (defined as $\ddot{C}_e{}^i$ above) can be expressed as follows:

$$\dot{C}_e{}^i = C_e{}^i \dot{\Omega}_{ie}{}^e + \dot{C}_e{}^i \Omega_{ie}{}^e$$

$$\ddot{C}_e{}^i = C_e{}^i \dot{\Omega}_{ie}{}^e + C_e{}^i \Omega_{ie}{}^e \Omega_{ie}{}^e$$

$$\ddot{C}_e{}^i = C_e{}^i (\dot{\Omega}_{ie}{}^e + \Omega_{ie}{}^e \Omega_{ie}{}^e) \quad (5)$$

Assuming the Earth's rotation rate is constant, the following can be obtained:

$$\ddot{C}_e{}^i = C_e{}^i \Omega_{ie}{}^e \Omega_{ie}{}^e \quad (6)$$

The transformation of a position vector from the ECEF frame of reference to the ECI frame of reference can be expressed as follows:

$$\vec{r}^i = C_e{}^i \vec{r}^e \quad (7)$$

Taking the derivative with respect to time yields velocity, which can be expressed as:

$$\dot{\vec{r}}^i = C_e{}^i \dot{\vec{r}}^e + \dot{C}_e{}^i \vec{r}^e \quad (8)$$

Taking the second derivative with respect to time yields acceleration, which can be expressed as:

$$\ddot{\vec{r}}^i = C_e{}^i \ddot{\vec{r}}^e + \dot{C}_e{}^i \dot{\vec{r}}^e + \dot{C}_e{}^i \dot{\vec{r}}^e + \ddot{C}_e{}^i \vec{r}^e$$

$$\ddot{\vec{r}}^i = C_e{}^i \ddot{\vec{r}}^e + 2\dot{C}_e{}^i \dot{\vec{r}}^e + \ddot{C}_e{}^i \vec{r}^e$$

$$\ddot{\vec{r}}^i = C_e{}^i \ddot{\vec{r}}^e + 2C_e{}^i \Omega_{ie}{}^e \dot{\vec{r}}^e + C_e{}^i \Omega_{ie}{}^e \Omega_{ie}{}^e \vec{r}^e \quad (9)$$

Using Equation (2) and solving for $\ddot{\vec{r}}^e$ yields:

$$\vec{g}^i + \vec{a}^i = C_e{}^i \ddot{\vec{r}}^e + \dot{C}_e{}^i \dot{\vec{r}}^e + \dot{C}_e{}^i \dot{\vec{r}}^e + \ddot{C}_e{}^i \vec{r}^e$$

$$-C_e{}^i \ddot{\vec{r}}^e = -(\vec{g}^i + \vec{a}^i) + \dot{C}_e{}^i \dot{\vec{r}}^e + \dot{C}_e{}^i \dot{\vec{r}}^e + \ddot{C}_e{}^i \vec{r}^e$$

$$C_e{}^i \ddot{\vec{r}}^e = \vec{g}^i + \vec{a}^i - \dot{C}_e{}^i \dot{\vec{r}}^e - \dot{C}_e{}^i \dot{\vec{r}}^e - \ddot{C}_e{}^i \vec{r}^e$$

$$C_e{}^i \ddot{\vec{r}}^e = \vec{g}^i + \vec{a}^i - 2C_e{}^i \Omega_{ie}{}^e \dot{\vec{r}}^e - \ddot{C}_e{}^i \vec{r}^e$$

$$C_e{}^i \ddot{\vec{r}}^e = \vec{g}^i + \vec{a}^i - 2C_e{}^i \Omega_{ie}{}^e \dot{\vec{r}}^e - C_e{}^i \Omega_{ie}{}^e \Omega_{ie}{}^e \vec{r}^e \quad (10)$$

Multiplying through by $(C_e{}^i)^T$ yields:

$$\ddot{\vec{r}}^e = \vec{g}^e + \vec{a}^e - 2\Omega_{ie}{}^e \dot{\vec{r}}^e - \Omega_{ie}{}^e \Omega_{ie}{}^e \vec{r}^e \quad (11)$$

Note that Equation (11) is an ordinary, second-order differential equation, which can be integrated once to obtain velocity in the ECEF frame of reference and then once more to obtain position in the ECEF frame of reference. Equation (11) can be transformed into a system of two first-order ordinary differential equations by introducing ECEF velocity as follows:

$$\frac{d}{dt}\vec{r}^e = \dot{\vec{r}}^e \quad (12)$$

$$\frac{d}{dt}\dot{\vec{r}}^e = \vec{g}^e + \vec{a}^e - 2\Omega_{ie}{}^e \dot{\vec{r}}^e - \Omega_{ie}{}^e \Omega_{ie}{}^e \vec{r}^e$$

Airborne accelerometers and other accelerometers used in vehicles 102 or other objects (such as in the IMU 104) measure the difference between inertial kinetic acceleration ($\vec{a}$) and gravitational acceleration ($\vec{g}$). This difference is called "specific force" and is essentially the sum of all contact forces divided by mass, which can be expressed as:

$$\vec{f} = \vec{a} - \vec{g} \quad (13)$$

For an accelerometer in free fall in a vacuum, $\vec{a} = \vec{g}$, so $\vec{f} = \vec{0}$. For an accelerometer at rest in a gravitational field, $\vec{a} = \vec{0}$, so $\vec{f} = -\vec{g}$. Therefore, acceleration due to gravity (mass attraction) can be calculated by the processing system 106 during travel to navigate properly. As a result, specific force can essentially be the on-board measurement of the accelerations due to thrust and aerodynamics by three (ideally orthogonal) IMU axes (such as in the coordinate system 308). This is typically output from the IMU 104 in the form of "delta V" increments over an IMU measurement cycle. The IMU measurement cycle is defined as a period of time ($\Delta t$), which in some instances can be on the order of milliseconds. The "delta V" increments can be expressed as:

$$\overrightarrow{\Delta V^b}(t+\Delta t) = \int_t^{t+\Delta t} \overrightarrow{a^b}(t) dt \quad (14)$$

The superscript "b" in Equation (14) implies that the integration is carried out with reference to the vehicle body or IMU frame of reference (which may or may not be identical to one another). If the vehicle body frame of reference and the IMU frame of reference are not identical, they can merely differ by an orthogonal transformation for the purposes of transforming the $\overrightarrow{\Delta V}$ vector into vehicle body coordinates.

In order to maintain knowledge of the velocity and position of the vehicle 102 relative to an Earth-fixed frame of reference (the ECEF frame of reference), the vector $\overrightarrow{\Delta V}$ can be transformed from the vehicle body/IMU frame of reference into the Earth-fixed frame. In order to accomplish this, an accurate estimate of the orthogonal transformation from the body/IMU frame of reference to the ECEF frame of reference can be maintained by the navigation system (such as by the processing system 106). This can be expressed as:

$$C_b{}^e = C_i{}^e \times C_b{}^i \quad (15)$$

This defines the body/IMU-to-ECEF transformation ($C_b{}^e$) as the product of the body/IMU-to-ECI transformation ($C_b{}^i$) and the ECI-to-ECEF transformation ($C_i{}^e$). The body/IMU-to-ECEF transformation can be maintained using angular rates as measured by gyroscopes of the IMU 104 (which may occur in the same manner as in inertial navigation). The ECI-to-ECEF transformation can be determined based on computations by the processing system 106. In some instances, the IMU 104 contains three gyroscopes mounted on three (ideally orthogonal) axes and measure angular rates of the body/IMU frame of reference relative to the inertial frame of reference. These are typically output from the IMU 104 in the form of three "delta angles" about the IMU axes over the IMU measurement cycle. This can be expressed as:

$$\overrightarrow{\Delta \theta_{ib}{}^b}(t+\Delta t) = \int_t^{t+\Delta t} \overrightarrow{\omega_{ib}{}^b}(t) dt \quad (16)$$

The angular rate of the vehicle body/IMU frame of reference relative to the Earth-fixed frame of reference can be determined using the following expression:

$$\overrightarrow{\omega_{eb}{}^b} = \overrightarrow{\omega_{ib}{}^b} - C_e{}^b \overrightarrow{\omega_{ie}{}^e} \quad (17)$$

Unfortunately, Equation (17) involves the orthogonal transformation that is to be maintained. In other words, the expression to compute $\overrightarrow{\omega_{eb}{}^b}$, which is used to maintain $C_e{}^b$, relies on $C_e{}^b$ itself. As a result, moving from one IMU measurement cycle to another requires storage of the $C_e{}^b$ matrix, as well as an assumption that the $C_e{}^b$ matrix has not changed (which can introduce small errors if incorrect). In some embodiments, this difficulty can be overcome by realizing that $\vec{\psi}_{1e}^{e}$ is small compared to $\vec{\omega}_{1b}^{b}$. The average angular rate of the body/IMU relative to the inertial frame of reference (meaning $\vec{\omega}_{1b}^{b}$) across the IMU measurement interval can be treated as a constant angular rate across the IMU measurement interval. Also, the angular rate of the Earth-fixed frame of reference relative to the inertial frame of reference (meaning $\omega_{1e}^{e}$) can be regarded as constant over the IMU measurement interval. Using the orthogonal transformation and the angular rate of the Earth-fixed frame of reference relative to the inertial frame of reference from the previous IMU measurement interval, the delta angles of the body/IMU relative to the Earth-fixed frame of reference can be computed as follows:

$$\overrightarrow{\Delta\theta_{eb}^{b}(t+\Delta t)} = \overrightarrow{\Delta\theta_{1b}^{b}(t+\Delta t)} - C_{e}^{b}(t)\overrightarrow{\omega_{1e}^{e}(t)}\Delta t \quad (18)$$

A second-order algorithm to maintain the quaternion that represents the orthogonal transformation between the vehicle body/IMU frame of reference and the Earth-fixed frame of reference can be expressed as follows:
where:

$$|\overrightarrow{\Delta\theta_{eb}^{b}(t+\Delta t)}| = \sqrt{(\overrightarrow{\Delta\theta_{eb}^{b}(t+\Delta t)})^{T}(\overrightarrow{\Delta\theta_{eb}^{b}(t+\Delta t)})} \quad (20)$$

$$\Omega_{\theta} = \begin{bmatrix} 0 & \Delta\theta_{eb}^{b}(t+\Delta t)_{0} & \Delta\theta_{eb}^{b}(t+\Delta t)_{1} & \Delta\theta_{eb}^{b}(t+\Delta t)_{2} \\ -\Delta\theta_{eb}^{b}(t+\Delta t)_{0} & 0 & \Delta\theta_{eb}^{b}(t+\Delta t)_{2} & -\Delta\theta_{eb}^{b}(t+\Delta t)_{1} \\ -\Delta\theta_{eb}^{b}(t+\Delta t)_{1} & -\Delta\theta_{eb}^{b}(t+\Delta t)_{2} & 0 & \Delta\theta_{eb}^{b}(t+\Delta t)_{0} \\ -\Delta\theta_{eb}^{b}(t+\Delta t)_{2} & \Delta\theta_{eb}^{b}(t+\Delta t)_{1} & -\Delta\theta_{eb}^{b}(t+\Delta t)_{0} & 0 \end{bmatrix} \quad (21)$$

Another technique for maintaining the orthogonal transformation from the Earth-fixed frame of reference to the vehicle body/IMU frame of reference can be used for vehicles with relatively short and known mission durations. For example, expendable launch vehicles, short-range strategic missiles, unmanned aerial vehicles (UAVs), and other types of vehicles 102 or other objects (such as over short segments of their mission paths when navigating with sensors alone) can fall into this category. The inertial-to-body or inertial-to-IMU transformation can be maintained throughout flight/travel using a second-order update and IMU delta angle measurements. Note that this scheme may use an initial transformation from ECEF-to-ECI and an inertial-to-body frame/IMU transformation at some epoch that have been loaded into the navigation system. The transformation from the Earth-fixed frame of reference to the inertial frame of reference can be computed as follows.

The inertial to Earth-fixed transformation can be expressed as follows:

$$\overrightarrow{\Delta\theta_{1e}^{e}(t+\Delta t)} = \overrightarrow{\omega_{1e}^{e}(t)} * \Delta t \quad (22)$$

$$q_{i}^{e}(t+\Delta t) = \Bigg[ \cos\Big(\frac{1}{2}|\overrightarrow{\Delta\theta_{1e}^{e}(t+\Delta t)}|\Big)I + \frac{1}{|\overrightarrow{\Delta\theta_{1e}^{e}(t+\Delta t)}|}\sin\Big(\frac{1}{2}|\overrightarrow{\Delta\theta_{1e}^{e}(t+\Delta t)}|\Big)\Omega_{\theta}\Bigg]q_{i}^{e}(t)$$

$$q_{i}^{e}(t+\Delta t)\xrightarrow{\text{yields}} C_{i}^{e}(t+\Delta t) \quad (23)$$

Here, $\Omega_{\theta}$ has been redefined here as:

$$\Omega_{\theta} = \begin{bmatrix} 0 & \Delta\theta_{ie}^{e}(t+\Delta t)_{0} & \Delta\theta_{ie}^{e}(t+\Delta t)_{1} & \Delta\theta_{ie}^{e}(t+\Delta t)_{2} \\ -\Delta\theta_{ie}^{e}(t+\Delta t)_{0} & 0 & \Delta\theta_{ie}^{e}(t+\Delta t)_{2} & -\Delta\theta_{ie}^{e}(t+\Delta t)_{1} \\ -\Delta\theta_{ie}^{e}(t+\Delta t)_{1} & -\Delta\theta_{ie}^{e}(t+\Delta t)_{2} & 0 & \Delta\theta_{ie}^{e}(t+\Delta t)_{0} \\ -\Delta\theta_{ie}^{b}(t+\Delta t)_{2} & \Delta\theta_{ie}^{e}(t+\Delta t)_{1} & -\Delta\theta_{ie}^{e}(t+\Delta t)_{0} & 0 \end{bmatrix} \quad (24)$$

Similarly, the inertial-to-body/IMU transformation given $\overrightarrow{\Delta\theta_{1b}^{b}(t+\Delta t)}$ from the IMU 104 can be expressed as:

$$q_{i}^{b}(t+\Delta t) = \quad (25)$$
$$\Bigg[\cos\Big(\frac{1}{2}|\overrightarrow{\Delta\theta_{1b}^{b}(t+\Delta t)}|\Big)I + \frac{1}{|\overrightarrow{\Delta\theta_{1b}^{b}(t+\Delta t)}|}\sin\Big(\frac{1}{2}|\overrightarrow{\Delta\theta_{1b}^{b}(t+\Delta t)}|\Big)\Omega_{\theta}\Bigg]q_{i}^{b}(t)$$

$$q_{i}^{b}(t+\Delta t)\xrightarrow{\text{yields}} C_{i}^{b}(t+\Delta t)) \quad (26)$$

Here, $\Omega_{\theta}$ has been redefined here as $$\Omega_{\theta} = \begin{bmatrix} 0 & \Delta\theta_{ib}^{b}(t+\Delta t)_{0} & \Delta\theta_{ib}^{b}(t+\Delta t)_{1} & \Delta\theta_{ib}^{b}(t+\Delta t)_{2} \\ -\Delta\theta_{ib}^{b}(t+\Delta t)_{0} & 0 & \Delta\theta_{ib}^{b}(t+\Delta t)_{2} & -\Delta\theta_{ib}^{b}(t+\Delta t)_{1} \\ -\Delta\theta_{ib}^{b}(t+\Delta t)_{1} & -\Delta\theta_{ib}^{b}(t+\Delta t)_{2} & 0 & \Delta\theta_{ib}^{b}(t+\Delta t)_{0} \\ -\Delta\theta_{ib}^{b}(t+\Delta t)_{2} & \Delta\theta_{ib}^{b}(t+\Delta t)_{1} & -\Delta\theta_{ib}^{b}(t+\Delta t)_{0} & 0 \end{bmatrix} \quad (27)$$

As a result, the following can be obtained:

$$C_{b}^{e}(t+\Delta t) = C_{i}^{e}(t+\Delta t)(C_{i}^{b}(t+\Delta t))^{T} \quad (28)$$

Note that errors in the transformation from ECI to ECEF can build up over time with this scheme because (i) precession, nutation, and polar motion are not accounted for and (ii) it is assumed that the change in the ECI-to-ECEF transformation is a simple rotation about the ECEF +Z axis 410c. In some cases, quaternions representing the ECI-to-ECEF transformation (meaning quaternions representing $C_{i}^{e}$) and spanning the mission duration can be stored at a regular time step and interpolated, such as by using a standard quaternion interpolation algorithm. In other words, a sequence of transformations $C_{I}^{e}(t_{1})$, $C_{I}^{e}(t_{2})$, . . . , $C_{I}^{e}(t_{n})$ may be stored on board a vehicle 102 or otherwise stored for different times $t_{1}, t_{2}, \ldots, t_{n}$, and interpolation may be used to obtain the transformation at the desired times.

In these embodiments, it can be seen that $-2\Omega_{ie}^{e}$ $\overrightarrow{r^{e}(t)}-\Omega_{ie}^{e}\Omega_{ie}^{e}\overrightarrow{r^{e}(t)}$ is small and can be integrated using a first-order algorithm (such as rectangular integration). It can also be seen that acceleration due to mass attraction is nearly constant over the IMU measurement cycle $\Delta t$. As a result, this leads to the following second-order position and velocity update formulas:

$$\overrightarrow{r^{e}(t+\Delta t)} = \quad (29)$$
$$\overrightarrow{r^{e}(t)} + \overrightarrow{\dot{r}^{e}(t)}\Delta t + \frac{1}{2}\Big(\overrightarrow{g^{e}(r^{e}(t))} - 2\Omega_{ie}^{e}\overrightarrow{\dot{r}^{e}(t)} - \Omega_{ie}^{e}\Omega_{ie}^{e}\overrightarrow{r^{e}(t)}\Big)\Delta t\Delta t +$$
$$\frac{1}{2}C_{b}^{e}(t+\Delta t)\overrightarrow{\Delta V^{b}(t+\Delta t)}\Delta t$$

$$\dot{R}^{e}(t+\Delta t) = \overrightarrow{\dot{r}^{e}(t)} + \quad (30)$$
$$\Big(\overrightarrow{g^{e}(r^{e}(t))} - 2\Omega_{ie}^{e}\overrightarrow{\dot{r}^{e}(t)} - \Omega_{ie}^{e}\Omega_{ie}^{e}\overrightarrow{r^{e}(t)}\Big)\Delta t + C_{b}^{e}(t+\Delta t)\overrightarrow{\Delta V^{b}(t+\Delta t)}$$

Equations (29) and (30) represent equations of motion that can be numerically integrated by the processing system 106 in order to provide accurate position and velocity of the vehicle 102 or other object over time. Note here that Equations (29) and (30) only involve a current estimate of state and other data from the current time step (where the current state estimate comes from the immediately-prior iteration or measurement cycle), along with IMU updates. As a result, Equations (29) and (30) do not require storing of data from multiple time steps, which is commonly needed in other techniques (such as those that rely on Simpson's rule or Runge-Kutta techniques).

If needed or desired, it is also possible to determine the heading and geodetic latitude, longitude, and altitude of the vehicle 102 or other object. A local North-East-Down (NED) frame of reference is defined as a frame of reference directly below a vehicle 102 or other object at the surface of the Earth reference ellipse. In the NED frame of reference, the +X axis (N) points due north (true north), the +Y axis (E) points due east, and the +Z axis (D) points down along the local vertical (a line perpendicular to the tangent to the reference ellipse directly below the vehicle 102 or other object). Heading can be readily computed in this frame of reference. Here, the conversion from ECEF to NED can be accomplished using the following equations:

$$Z(\lambda) = \begin{bmatrix} \cos(\lambda) & \sin(\lambda) & 0 \\ -\sin(\lambda) & \cos(\lambda) & 0 \\ 0 & 0 & 1 \end{bmatrix} \quad (31)$$

$$Y\left(-\left[\frac{\pi}{2}+\phi\right]\right) = \begin{bmatrix} \cos\left(-\left[\frac{\pi}{2}+\phi\right]\right) & 0 & -\sin\left(-\left[\frac{\pi}{2}+\phi\right]\right) \\ 0 & 1 & 0 \\ \sin\left(-\left[\frac{\pi}{2}+\phi\right]\right) & 0 & \cos\left(-\left[\frac{\pi}{2}+\phi\right]\right) \end{bmatrix} \quad (32)$$

$$C_{ECEF}^{NED} = Y\left(-\left[\frac{\pi}{2}+\phi\right]\right) * Z(\lambda) \quad (33)$$

To compute heading from navigational data, the following can be used:

$$\vec{V}_{NED} = C_{ECEF}^{NED} * \vec{r}^e \quad (34)$$

$$\psi = a\tan 2(V_{NED}[1], V_{NED}[0]) \quad (35)$$

It should be noted that $\vec{V}_{NED}$ has little meaning other than the parameterization of the object's velocity in the NED frame of reference.

Latitude, longitude, and altitude can be computed from navigational data to arbitrary accuracy, such as by using the following iterative procedure. Initial computations can be performed as follows:

$$e = \frac{\sqrt{RE^2 - RP^2}}{RE} \quad (36)$$

$$\lambda = \operatorname{atan2}(r^e[1], r^e[0]) \quad (37)$$

$$p = \sqrt{r^e[0]*r^e[0] + r^e[1]*r^e[1]} \quad (38)$$

$$\varphi = \tan^{-1}\left\{\left[\frac{r^e[2]}{P}\right]*\left[\frac{1.0}{1-e*e}\right]\right\} \quad (39)$$

One or more iterations may then be performed to loop through the following process until an arbitrary small change in latitude φ is detected:

$$N = \frac{(RE^2)}{\sqrt{RE^2 * \cos^2(\varphi) + RP^2 * \sin^2(\varphi)}} \quad (40)$$

$$h = \frac{p}{\cos(\varphi)} - N \quad (41)$$

$$\varphi = \tan^{-1}\left[\left(\frac{r^e[2]}{P}\right)*\left(\frac{1}{1-e*e*\frac{N}{N+h}}\right)\right] \quad (42)$$

The above process converges in a few iterations and should not present any computational problems for a modern real-time system. Also note that GPS raw data is supplied in the ECEF frame, which makes implementing a blended INS/GPS navigation solution more straightforward in the ECEF frame.

Note that the above has provided an explicit and detailed mathematical derivation of the equations of motion that may be used by the processing system 106 based on input from the IMU 104. Overall, this approach has various advantages, such as expressing gravity model equations in the Earth-fixed frame of reference, enhanced efficiency in implementing a blended INS/GPS navigation solution, and improved speed and efficiency in a real-time system. Accurate second-order state update equations can also be used, and unique techniques for maintaining the vehicle body or IMU-to-ECEF transformation can be used. In addition, the ability to convert navigation position and velocity in ECEF into heading and geodetic coordinates can be useful in some applications.

Although FIG. 4 illustrates examples of frames of reference including an ECEF frame of reference for navigation, various changes may be made to FIG. 4. For example, the inertial frame of reference and/or the Earth-fixed frame of reference may differ from those shown here. In that case, the equations shown above can be easily modified as needed in order to account for the differences in the frames of reference being used.

Figure 5:
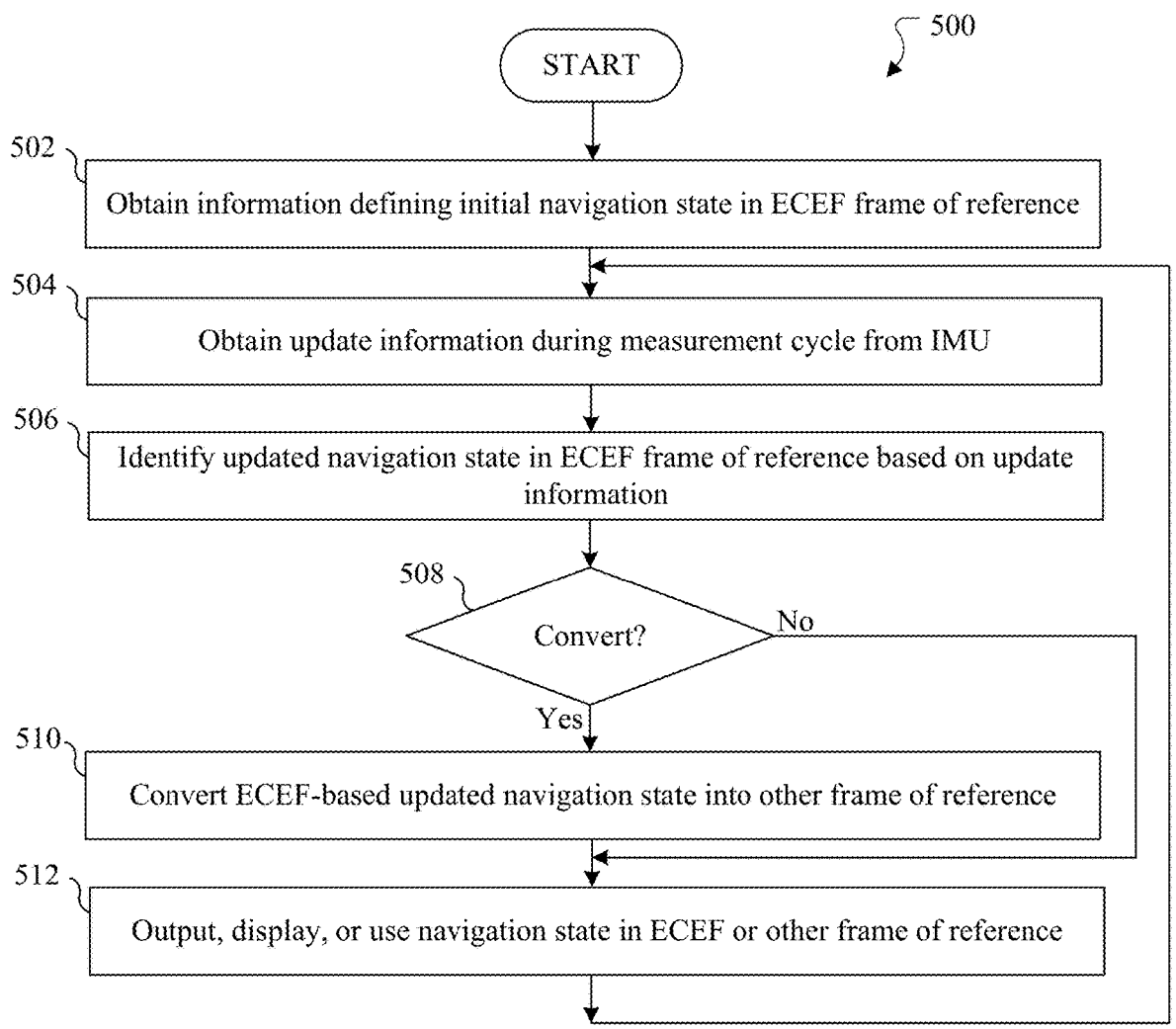
FIG. 5 illustrates an example method for navigation based on an ECEF frame of reference according to this disclosure.

FIG. 5 illustrates an example method 500 for navigation based on an ECEF frame of reference according to this disclosure. For ease of explanation, the method 500 is described as being performed using the IMU 104 and processing system 106 of the vehicle 102 in FIG. 1 using the ECEF frame of reference shown in FIG. 4. However, the method 500 may be used with any other suitable devices and in any other suitable systems, and the method 500 may involve the use of any other suitable Earth-fixed frames of reference.

As shown in FIG. 5, information defining an initial navigation state in an ECEF frame of reference is obtained at step 502. This may include, for example, the processing system 106 obtaining information defining a known position and velocity of the vehicle 102 or other object at some specified time. The information defining the initial navigation state may be obtained in any suitable manner. In some embodiments, the ECEF frame of reference may represent the ITRS frame of reference defined by the axes 410a-410c described above or other suitable Earth-fixed frame of reference.

Update information is received during a measurement cycle from an IMU at step 504. This may include, for example, the processing system 106 receiving the update information from various sensors 304, 306 of the IMU 104. As particular examples, this may include the processing system 106 receiving "delta V" measurements identifying measured accelerations due to thrust and aerodynamics from the IMU 104 and receiving "delta angles" measurements identifying measured angular rates of the vehicle body or IMU frame of reference relative to an inertial frame of reference. An updated navigation state in the ECEF frame of reference is determined at step 506. This may include, for example, the processing system 106 using the update information to integrate or otherwise use Equations (29) and (30) above to identify updated position and velocity of the vehicle 102 or other object.

A determination is made whether to convert the updated navigation state from the ECEF frame of reference to another frame of reference at step 508. If so, the ECEF-based updated navigation state is converted to another frame of reference at step 510. This may include, for example, the processing system 106 using Equations (31)-(42) above and an iterative process to convert the ECEF-based updated navigation state into a heading and geodetic latitude, longitude, and altitude of the vehicle 102 or other object. Note that conversions into one or more other or additional frames of reference may also or alternatively occur here.

The updated navigation state (in the ECEF frame of reference and/or another frame of reference) can be displayed, output, or otherwise used in some manner at step 512. This may include, for example, the processing system 106 using the updated navigation state (or outputting the updated navigation state to another component) to monitor a travel path of the vehicle 102 or other object and, if necessary, make adjustments to operation of the vehicle 102 or other object in order to keep the vehicle 102 or other object on or near a desired travel path. This may also or alternatively include the processing system 106 using the updated navigation state (or outputting the updated navigation state to another component) to display current navigation-related information, possibly along with prior navigation-related information and/or predicted future navigation-related information, to an operator or other personnel associated with the vehicle 102 or other object. Note, however, that the updated navigation state may be used in any other or additional manner.

The process of obtaining updated IMU information and identifying/using an updated navigation state based on the updated IMU information can be repeated any number of times during any number of iterations and at any suitable regular or other interval of time. For instance, the measurement cycle of the IMU 104 and the associated processing by the processing system 106 may occur at a specified time interval, such as every ten milliseconds or at some other regular interval of time. This allows the processing system 106 to repeatedly identify updated navigation state information for the vehicle 102 or other object over time and to use the updated navigation state information as needed or desired.

Although FIG. 5 illustrates one example of a method 500 for navigation based on an ECEF frame of reference, various changes may be made to FIG. 5. For example, while shown as a series of steps, various steps in FIG. 5 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    obtaining information from an inertial measurement unit (IMU) identifying accelerations and changes in angular orientation associated with an object in motion;
    identifying a navigation state of the object within an Earth-fixed frame of reference using the information; and
    performing one or more navigation functions based on the navigation state;
    wherein identifying the navigation state of the object comprises, in each of multiple iterations, using (i) an object body or IMU-to-inertial transformation and (ii) an inertial-to-Earth-fixed transformation; and wherein the inertial-to-Earth-fixed transformation is updated during the iterations and stored as a sequence of transformations such that inertial-to-Earth-fixed transformation used during a specific one of the iterations is determined using quaternion interpolation of the sequence of transformations.

2. The method of claim 1, wherein the inertial-to-Earth-fixed transformation is updated ruing the iterations using a constant three-dimensional angular rate vector of Earth-fixed rotation relative to an inertial frame of reference.

3. The method of claim 1, wherein identifying the navigation state of the object comprises performing numerical integration of equations of motion, the equations of motion based on a previous estimate of the navigation state and the information from the IMU.

4. The method of claim 3, wherein the numerical integration of the equations of motion in a current iteration does not use multiple previous estimates of the navigation state from multiple previous iterations.

5. The method of claim 1, further comprising:
converting the navigation state of the object from the Earth-fixed frame of reference to another frame of reference;
wherein performing the one or more navigation functions comprises performing the one or more navigation functions based on at least one of: the navigation state of the object within the Earth-fixed frame of reference and the converted navigation state of the object within the other frame of reference.

6. The method of claim 1, wherein:
the information from the IMU is associated with an Earth Centered Inertial (ECI) frame of reference; and
the Earth-fixed frame of reference is an Earth Centered Earth Fixed (ECEF) frame of reference.

7. The method of claim 1, wherein the sequence of transformations includes an inertial-to-ECEF transformation matrix for each time step.

8. An apparatus comprising:
an inertial measurement unit (IMU) configured to generate information identifying accelerations and changes in angular orientation associated with an object in motion; and
at least one processor configured to identify a navigation state of the object within an Earth-fixed frame of reference using the information and perform one or more navigation functions based on the navigation state;
wherein, to identify the navigation state of the object, the at least one processor is configured, in each of multiple iterations, to use (i) an object body or IMU-to-inertial transformation and (ii) an inertial-to-Earth-fixed transformation;
wherein the at least one processor is configured to update the inertial-to-Earth-fixed transformation during the iterations and store the updated inertial-to-Earth-fixed transformations as a sequence of transformations; and
wherein the at least one processor is configured to determine the inertial-to-Earth-fixed transformation used during a specific one of the iterations based on a quaternion interpolation of the sequence of transformations.

9. The apparatus of claim 8, wherein
the at least one processor is configured to update the inertial-to-Earth-fixed transformation during the iterations using a constant three-dimensional angular rate of Earth-fixed rotation relative to an inertial frame of reference.

10. The apparatus of claim 8, wherein:
to identify the navigation state of the object, the at least one processor is configured to perform numerical integration of equations of motion; and
the equations of motion are based on a previous estimate of the navigation state and the information from the IMU.

11. The apparatus of claim 10, wherein the numerical integration of the equations of motion in a current iteration does not use multiple previous estimates of the navigation state from multiple previous iterations.

12. The apparatus of claim 8, wherein:
the at least one processor is configured to convert the navigation state of the object from the Earth-fixed frame of reference to another frame of reference; and
the at least one processor is configured to perform the one or more navigation functions based on at least one of: the navigation state of the object within the Earth-fixed frame of reference and the converted navigation state of the object within the other frame of reference.

13. The apparatus of claim 8, wherein:
the information from the IMU is associated with an Earth Centered Inertial (ECI) frame of reference; and
the Earth-fixed frame of reference is an Earth Centered Earth Fixed (ECEF) frame of reference.

14. The apparatus of claim 8, wherein the sequence of transformations includes an inertial-to-ECEF transformation matrix for each time step.

15. A non-transitory computer readable medium containing instructions that when executed cause at least one processor to:
obtain information from an inertial measurement unit (IMU) identifying accelerations and changes in angular orientation associated with an object in motion;
identify a navigation state of the object within an Earth-fixed frame of reference using the information; and
perform one or more navigation functions based on the navigation state;
wherein the instructions that when executed cause the at least one processor to identify the navigation state of the object comprise:
instructions that when executed cause the at least one processor to identify, in each of multiple iterations, the navigation state of the object using (i) an object body or IMU-to-inertial transformation and (ii) an inertial-to-Earth-fixed transformation; and
wherein the medium further contains instructions that when executed cause the at least one update the inertial-to-Earth-fixed transformation during the iterations and store the updated inertial-to-Earth-fixed transformations as a sequence of transformations; and
determine the inertial-to-Earth-fixed transformation used during a specific one of the iterations based on a quaternion interpolation of the sequence of transformations.

16. The non-transitory computer readable medium of claim 15, wherein the medium further contains instructions that when executed cause the at least one processor to:
update the inertial-to-Earth-fixed transformation during the iterations using a constant three-dimensional angular rate vector of Earth-fixed rotation relative to an inertial frame of reference.

17. The non-transitory computer readable medium of claim 15, wherein the instructions that when executed cause the at least one processor to identify the navigation state of the object comprise:
instructions that when executed cause the at least one processor to perform numerical integration of equations of motion, the equations of motion based on a previous estimate of the navigation state and the information from the IMU.

18. The non-transitory computer readable medium of claim 17, wherein the numerical integration of the equations of motion in a current iteration does not use multiple previous estimates of the navigation state from multiple previous iterations.

19. The non-transitory computer readable medium of claim 15, wherein:
the medium further contains instructions that when executed cause the at least one processor to convert the navigation state of the object from the Earth-fixed frame of reference to another frame of reference; and
the one or more navigation functions are based on at least one of: the navigation state of the object within the Earth-fixed frame of reference and the converted navigation state of the object within the other frame of reference.

20. The non-transitory computer readable medium of claim 15, wherein the sequence of transformations includes an inertial-to-ECEF transformation matrix for each time step.

* * * * *